United States Patent [19]

Kalazny

[11] Patent Number: 4,960,203

[45] Date of Patent: Oct. 2, 1990

[54] ADJUSTABLE HEIGHT ARTICLE SUPPORTING MECHANISM

[75] Inventor: Andrzej J. Kalazny, Wyomissing, Pa.

[73] Assignee: Dana Corporation, Toledo, Ohio

[21] Appl. No.: 390,536

[22] Filed: Aug. 7, 1989

[51] Int. Cl.$^5$ .............................................. B65G 17/32
[52] U.S. Cl. .................................. 198/802; 198/474.1
[58] Field of Search ................... 198/802, 474.1, 476.1,
198/477.1, 468.6; 188/312; 91/422, 401; 92/181 P

[56] References Cited

U.S. PATENT DOCUMENTS

| 874,639 | 12/1907 | Taylor | 198/474.1 |
|---|---|---|---|
| 2,410,808 | 11/1946 | Christensen . | |
| 2,462,580 | 2/1949 | Watson . | |
| 2,574,299 | 11/1951 | Sterrett . | |
| 2,709,420 | 5/1955 | Fullwood et al. . | |
| 2,977,166 | 3/1961 | Butler . | |
| 3,413,894 | 12/1968 | Kress et al. . | |
| 3,587,407 | 6/1971 | Wilson, Jr. | 91/422 X |
| 3,592,108 | 7/1971 | Rosaen et al. | 91/422 X |
| 3,759,303 | 9/1973 | Henrichs et al. | 198/474.1 X |
| 3,764,284 | 10/1973 | Rowe | 198/468.6 |
| 3,856,129 | 12/1974 | Baur et al. | 198/468.6 |
| 3,929,370 | 12/1975 | Farrell | 188/312 X |
| 3,961,559 | 6/1976 | Teramachi . | |
| 3,972,396 | 8/1976 | Bochnak | 188/312 |
| 3,998,030 | 12/1976 | Straub | 198/802 X |
| 4,088,220 | 5/1978 | Jacksch et al. | 198/802 X |
| 4,337,687 | 7/1982 | Hoover . | |
| 4,640,406 | 2/1987 | Willison | 198/476.1 X |
| 4,671,401 | 6/1987 | Truninger | 198/468.6 X |
| 4,729,283 | 3/1988 | Hillier . | |
| 4,813,529 | 3/1980 | Kawai et al. | 198/468.6 |
| 4,823,922 | 4/1989 | Ergun | 188/317 X |

FOREIGN PATENT DOCUMENTS

| 23066309 | 9/1974 | Fed. Rep. of Germany . | |
| 7603075 | 9/1977 | Netherlands | 188/312 |
| 0006441 | of 1895 | United Kingdom | 188/312 |

Primary Examiner—Joseph E. Valenza
Assistant Examiner—D. Glenn Dayoan
Attorney, Agent, or Firm—MacMillan, Sobanski & Todd

[57] ABSTRACT

An adjustable mechanism for supporting an article, particularly for use with an article transportation system, is disclosed. The support mechanism includes a closed cylinder having a movable piston disposed therein. The piston divides the interior of the cylinder into upper and lower closed chambers. A pair of oppositely oriented pressure relief valves are disposed in the piston to selectively permit fluid communication between the upper and lower chambers. The pressure relief valves open only when the pressure differential exerted thereacross exceeds a predetermined value such that the piston is normally locked in position within the cylinder. A first rod is connected to the piston and extends upwardly out of the cylinder. An article engaging platform is secured to the upper end of the upper rod. A second rod is also connected to the piston, extending downwardly out of the cylinder. The lower rod cooperates with a fixed guide to urge it upwardly or downwardly, as desired to raise or lower the platform relative to the cylinder. The guide may be adjustably supported to permit easy adjustment of the relative height of the platform.

17 Claims, 3 Drawing Sheets

ADJUSTABLE HEIGHT ARTICLE SUPPORTING MECHANISM

BACKGROUND OF THE INVENTION

This invention relates in general to article handling and transportation systems and in particular to an article supporting mechanism which is quickly and easily adjustable to differing heights and which is self locking at any desired height. This invention is particularly useful when used with an article transportation system, wherein irregularly shaped articles are transported from one location to another.

In most manufacturing operations and in many other situations, it is necessary to support and transport articles from one location to another, such as for further work operations or for assembly. Occasionally, the articles are supported by simply placing them on a flat surface, such as a conveyor belt, and then are transported by moving the flat surface. Transportation in this manner is possible when the sizes and shapes of the articles permit them to be supported in a stable position on the flat moving surface. In other words, the articles must be shaped in such a manner as to not move relative to the moving surface during transportation.

Unfortunately, many manufactured articles, such as stampings from a press machine, are irregularly shaped. Such articles are not well suited for transportation on a flat moving surface because they are not supported in a stable manner. As a result, the articles may undesirably tip over, roll off, or otherwise move relative to the moving surface during transportation. Therefore, for both convenience and safety, such irregularly shaped articles must be supported by appropriate means to prevent such undesirable movement during transportation.

Various mechanisms have been devised to support and transport irregularly shaped articles. One such mechanism involves the use of one or more pre-formed support members in conjunction with a conventional article transportation system. Such support members are shaped to engage the article at appropriate positions to provide the necessary stable support. The support members themselves are carried by the transportation system for movement from one location to another, together with the articles carried thereon. However, support members of this type are inefficient because each differently shaped article requires its own differently shaped support member.

Adjustable mechanisms are also known in the art for supporting and transporting irregularly shaped articles. Such adjustable support mechanisms are also carried by a conventional article transportation system and usually include one or more movable arms for engaging and supporting the article. The arms are initially moved to a desired height or position, which is determined by the shape of the article to be supported thereon. Then, the arms are locked in that position for use. Unfortunately, prior adjustable support mechanisms are also inefficient because they usually involve a number of manual operations (unlocking from the old position, adjusting to the new position, and re-locking in the new position) to change from supporting one article shape to another.

SUMMARY OF THE INVENTION

This invention relates to an improved adjustable mechanism for supporting an article, particularly for use with an article transportation system, wherein irregularly shaped articles may be supported and transported from one location to another. One or more of the support mechanisms are carried on and move with the transportation system to support the articles thereon. Each of the support mechanisms includes a closed cylinder having a movable piston disposed therein. The piston divides the interior of the cylinder into upper and lower closed chambers. A pair of oppositely oriented pressure relief valves are disposed in the piston to selectively permit fluid communication between the upper and lower chambers. The pressure relief valves open only when the pressure differential exerted thereacross exceeds a predetermined value. Thus, the piston is normally locked in position within the cylinder. A first rod is connected to the piston and extends upwardly out of the cylinder. An article engaging platform is secured to the upper end of the upper rod. A second rod is also connected to the piston, extending downwardly out of the cylinder. As the support mechanism is moved by the article transportation system, the lower rod cooperates with a fixed guide. The guide engages the lower rod to urge it upwardly or downwardly, as desired to raise or lower the platform relative to the cylinder. The force exerted by the guide is transmitted through the lower rod to the piston. When the force exerted on the piston causes the pressure differential across one of the pressure relief valves to exceed the predetermined value, the piston will move within the cylinder. Following such movement, the piston (and the platform carried thereon) will be automatically locked in the new position. The guide itself may be adjustably supported to permit easy adjustment of the height of the platform.

It is an object of this invention to provide an improved adjustable article supporting mechanism adapted for use with an article transportation system.

It is another object of this invention to provide such an article supporting mechanism which is quickly and easily adjustable from position to position.

It is a further object of this invention to provide such an article supporting mechanism which automatically locks itself in position after being moved.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
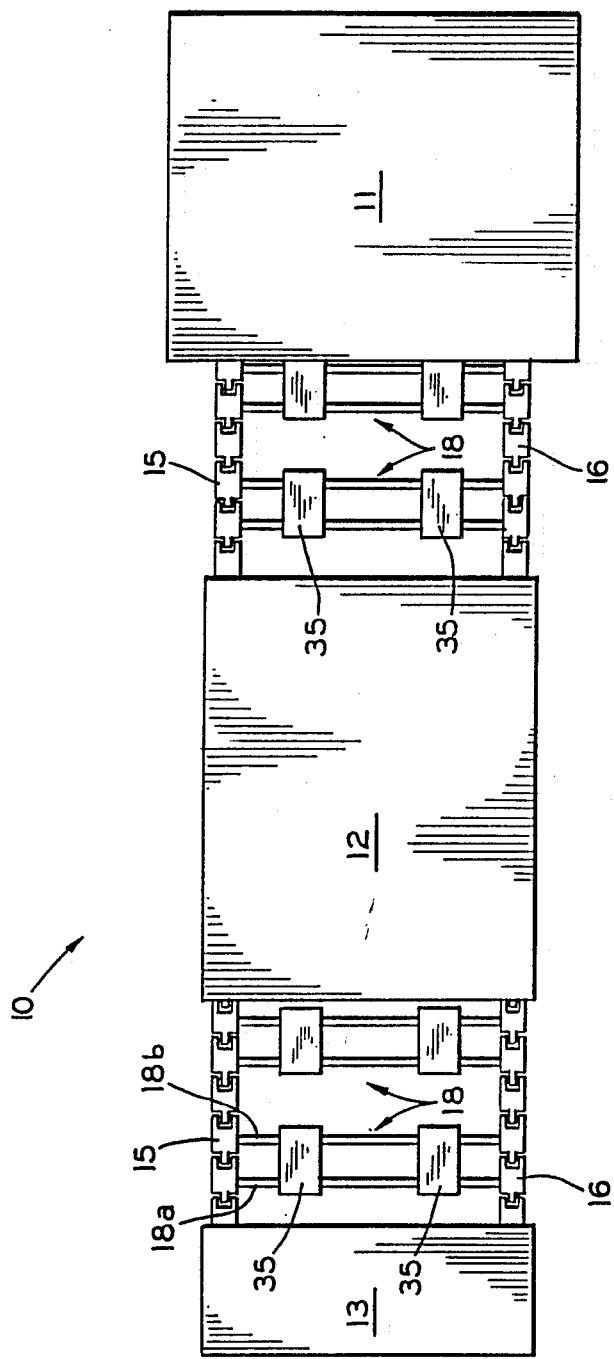
FIG. 1 is a top plan view schematically illustrating an article handling and transportation system including a plurality of adjustable article supporting mechanisms in accordance with this invention.
Figure 2:
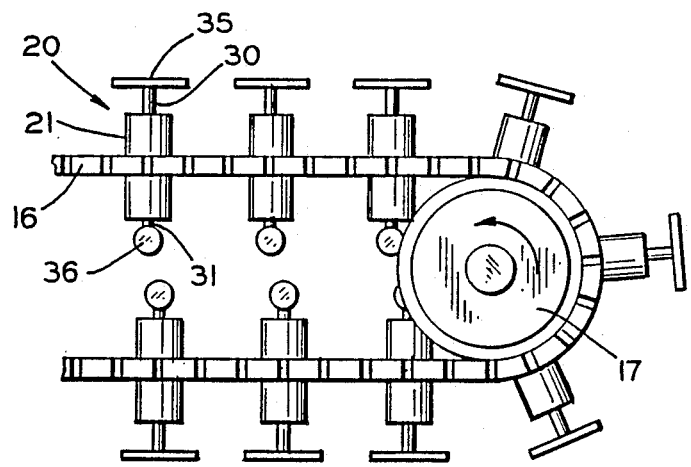
FIG. 2 is a side elevational view of one end of the article handling and transportation system illustrated in FIG. 1.
Figure 3:
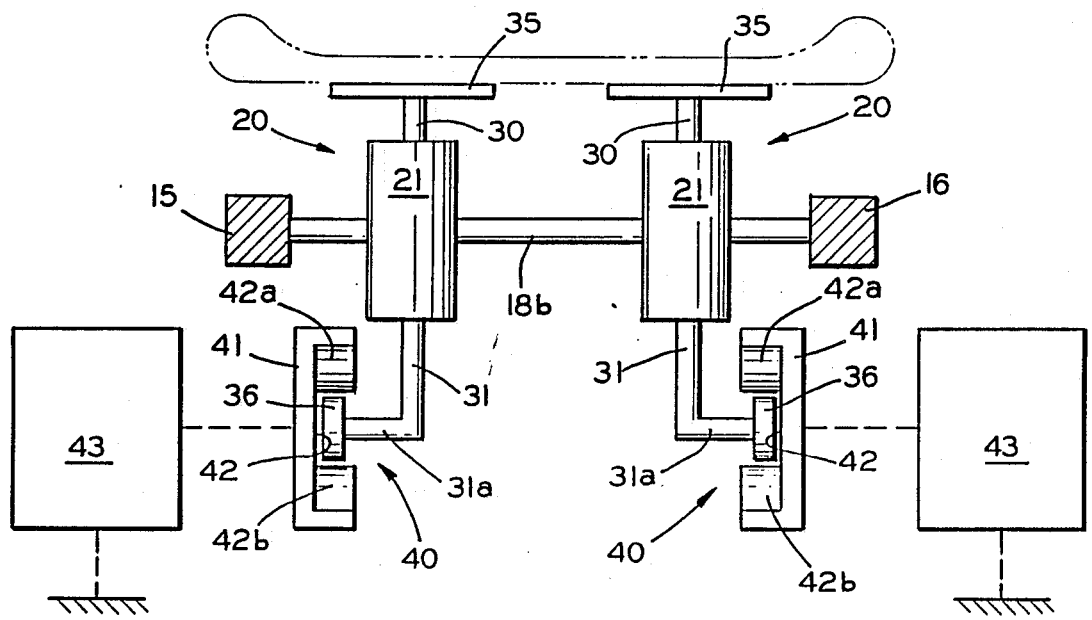
FIG. 3 is an end elevational view of the upper portion of the article handling and transportation system illustrated in FIGS. 1 and 2.

Referring now to the drawings, FIGS. 1 through 3 schematically illustrate portions of an article handling and transportation system, indicated generally at 10. The general structure and operation of the system 10 is well known in the art and, therefore, will be described only to the extent necessary for a clear understanding of this invention. The system 10 is adapted to engage and support articles (not shown) of varying size and shape and to transport such articles from one location to another. For example, as shown in FIG. 1, the system 10 may be used to transport articles from a first work station 11 (a press machine where the articles are formed) through a second work station 12 (a washing and drying apparatus) to a third work station 13 (an automatic stacker).

The transportation portion of the system 10 is conventional in the art, and the article supporting mechanism of this invention may be used with any other transportation or similar system. In the illustrated embodiment, the transportation portion of the system 10 includes a pair of spaced parallel chains 15 and 16. Each of the chains 15 and 16 is connected to form an endless loop. The chains 15 and 16 are carried on a plurality of pulleys 17 (only one of which is shown) so as to be synchronously driven in the direction indicated by the arrow in FIG. 2. A conventional motor (not shown) or other means may be used to rotate the pulley 17. As is readily apparent, rotation of the pulley 17 causes movement of the chains 15 and 16 throughout the system 10.

As best shown in FIG. 1, a plurality of cross bar pairs, indicated generally at 18, is connected between the chains 15 and 16 at spaced intervals. Each of the cross bar pairs 18 includes a first cross bar 18a and a second cross bar 18b. The first and second cross bars 18a and 18b extend generally perpendicular to the chains 15 and 16. Each of the first cross bars 18a is connected at its opposed ends to respective links in the chains 15 and 16 by any conventional means. For example, the opposed ends of the first cross bars 18a may be journalled in apertures formed in the links of such chains 15 and 16. The second cross bars 18b are similarly connected to adjacent or nearby links in the chains 15 and 16.

Between each of the cross bar pairs 18, one or more article supporting mechanisms, indicated generally at 20, are provided. In the illustrated embodiment, two of such mechanisms 20 are provided for each of the cross bar pairs 18. The article supporting mechanisms 20 may be secured to the cross bars 18a and 18b by any conventional means, such as welding. However, it may be desirable to releasably secure the article supporting mechanisms 20 to the first and second cross bars 18a and 18b so that such mechanisms 20 may be moved laterally therealong. In that event, any conventional releasable locking means (not shown) may be provided to secure the article supporting mechanisms 20 in desired locations on the first and second cross bars 18a and 18b.

Figure 4:
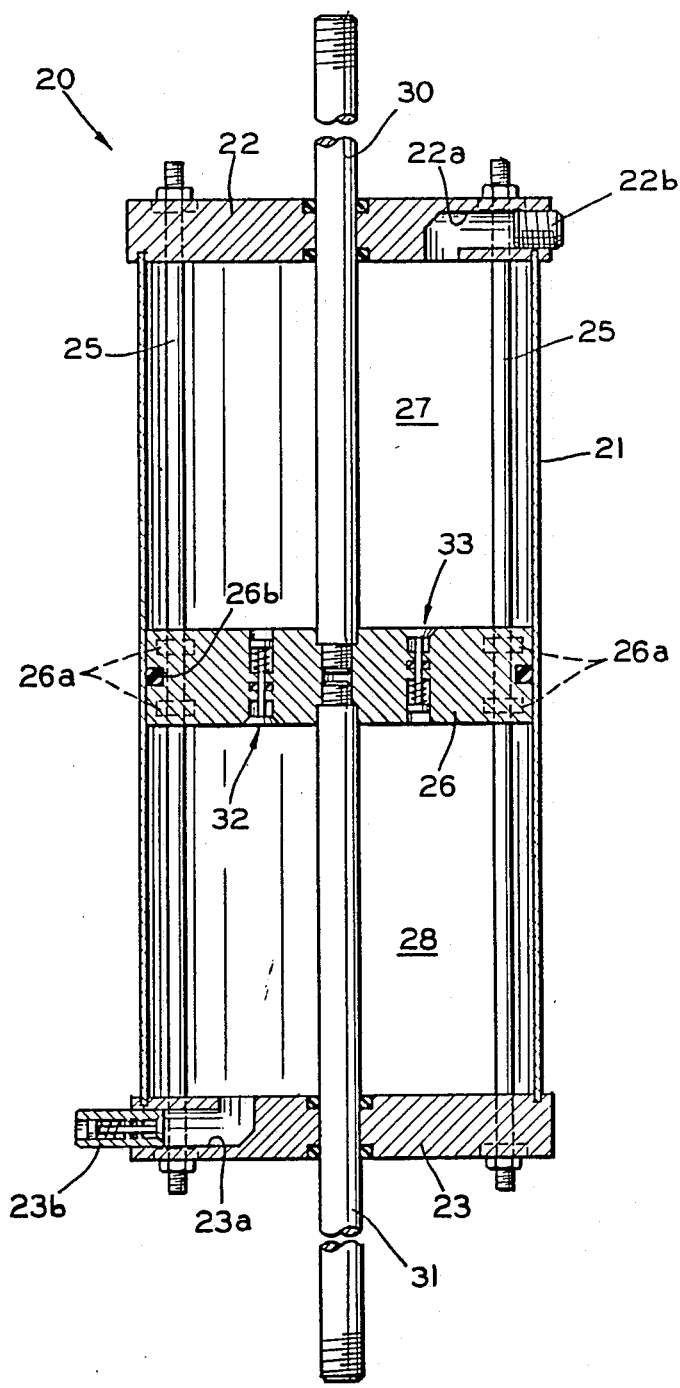
FIG. 4 is a sectional elevational view of one of the adjustable support mechanisms illustrated in FIGS. 2 and 3.

Referring now to FIG. 4, the structure of one of the article supporting mechanisms 20 is illustrated in detail. As shown therein, the mechanism 20 includes a hollow cylindrical housing 21. The cylinder 21 is closed by upper and lower end plates 22 and 23, respectively. In this embodiment, the interior of the cylinder 21 is filled with air at atmospheric pressure. However, as will be explained in greater detail below, the interior of the cylinder 21 may be filled with other fluids. Respective passageways 22a and 23a are formed through the end plates 22 and 23 between the closed interior of the cylinder 21 and the atmosphere. A plug 22b is disposed in the upper end plate passageway 22a to prevent fluid communication between the interior of the cylinder 21 and the atmosphere. A stem or check valve 23b is disposed in the lower end plate passageway 23a to permit one-way fluid communication into the interior of the cylinder 21.

A plurality of tie rods 25 are provided to secure the upper and lower end plates 22 and 23 to the cylinder 21. The tie rods 25 also increase the strength and rigidity of the cylinder 21. Within the closed interior of the cylinder 21, a movable piston 26 is disposed. The tie rods 25 extend through respective apertures formed through the piston 26, and conventional O-rings 26a provide a fluidtight seal therebetween. An O-ring 26b also provides a sealing engagement between the outer circumferential edge of the piston 26 and the inner circumferential surface of the cylinder 21.

The piston 26 divides the interior of the cylinder 21 into an upper chamber 27 and a lower chamber 28. An upper rod 30 is attached to the piston 26 and extends upwardly through the upper end plate 22. Similarly, a lower rod 31 is attached to the piston 26 and extends downwardly through the lower end plate 23. O-ring seals are provided between both rods 30 and 31 and the corresponding end plates 22 and 23. The functions of the upper and lower rods 30 and 31 will be explained in detail below.

A pair of pressure relief valves 32 and 33 are disposed within apertures formed through the piston 26. The first pressure relief valve 32 is oriented to permit the one-way flow of fluid from the upper chamber 27 to the lower chamber 28, but only when the pressure in the upper chamber 27 exceeds the pressure in the lower chamber 28 by a predetermined value. Conversely, the second pressure relief valve 33 is oppositely oriented to permit the one-way flow of fluid from the lower chamber 28 to the upper chamber 27, but only when the pressure in the lower chamber 28 exceeds the pressure in the upper chamber 27 by a predetermined value. In the illustrated embodiment, the pressure relief valves 32 and 33 can be conventional spring-biased, normally-closed check valves. Alternatively, a single bidirectional pressure relief valve may be used. The sizes of the springs determine the magnitudes of the pressure differential required to open the valves 32 and 33 to permit such fluid communication. The manner of operation of the article supporting mechanism 20 will be described in detail below.

Referring back to FIG. 3, a support platform 35 is attached to the upper end of the upper rod 30. The support platform 35 is adapted to engage and support a portion of an article, such as the irregularly shaped article shown in dotted lines in FIG. 3. The support platform 35 may be formed having any desired shape and may conform to the shape of the portion of the article being supported. The lower rod 31 has an angled leg portion 31a extending from the lower end thereof. A roller 36 is carried at the end of the angled leg portion 31a. As will be explained in detail below, the lower rod 31 and the roller 36 form a portion of a means for selectively moving the piston 26 within the cylinder 21 and, therefore, moving the support platform 35 to a desired height relative to the cylinder 21 and the system 10.

As mentioned above, two of the article supporting mechanisms 20 are secured to each of the cross bar pairs 18 for movement therewith. Thus, as best shown in FIG. 2, the mechanisms 20 move in an endless loop with the chains 15 and 16 throughout the article handling and transportation system 10. As they are moved, the mechanisms 20 carry the articles on the platforms 35, thereby transporting the articles from one location to another along the upper portion of the system 10. When they reach the end of the upper portion of the system 10, the articles are removed therefrom, such as by the automatic stacker at the third work station 13. However, the mechanisms 20 continue to move in the endless loop with the chains 15 and 16, travelling inverted along the lower portion of the system 10 until they return to the first work station 11. Thus, the mechanisms 20 continuously provide a means for supporting the articles and for transporting the articles through the system 10.

When an article is placed upon one of the support platforms 35, gravity causes the article to exert a force downwardly through the upper rod 30 against the piston 26. This force is transmitted through the piston 26 to the air in the lower chamber 28. In response thereto, the air in the lower chamber 28 exerts more pressure on the lower sides of the pressure relief valves 32 and 33 than the air in the upper chambers 27 exerts on the upper sides of such valves 32 and 33. In this condition, the first pressure relief valve 32 will always remain closed. However, the second relief valve 33 will remain closed only so long as the pressure differential thereacross is less than the predetermined value required to open it, as discussed above. Assuming that the weight of the article is insufficient to cause this pressure differential threshold to be exceeded, the second pressure relief valve 33 will remain closed. Consequently, the air in the lower chamber 28 is trapped therein, and the piston 26 is prevented from moving significantly relative to the cylinder 21.

If, however, the weight of the article causes a greater pressure differential to be exerted across the second pressure relief valve 33, the valve 33 will open. When this occurs, air will flow from the lower chamber 28 through the valve 33 to the upper chamber 27. As a result, the piston 26 will slide downwardly within the cylinder 21 toward the lower end plate 23. Thus, under normal circumstances, the second pressure relief valve 33 should be selected such that the predetermined pressure differential required to open it is greater than that caused by the normal weight of the article being supported on the platform 35. This ensures that the weight of the article will not cause significant movement of the piston 26 when placed on the support platform 35, and each of the platforms 35 remains at a generally constant height relative to its associated cylinder 21 during use.

However, from time to time, it may become desirable to change the relative heights of the support platforms 35. The need for such change may result from a change in the shape of the article being transported, such as might occur after a tooling changeover. Alternatively, it may be necessary to raise or lower the relative heights of the articles as they are being moved along the article handling and transportation system 10. In any event, a means for quickly and easily adjusting the heights of the platforms 35 relative to the cylinders 21 is indicated generally at 40 in FIG. 3.

Figure 5:
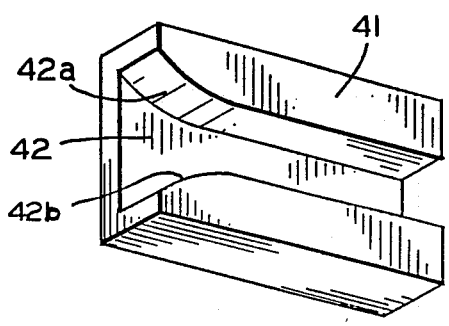
FIG. 5 is a perspective view of the guide illustrated in FIG. 3.

Each of the means for adjusting 40 includes a guide 41. The structure of one of the guides 41 is more fully illustrated in FIG. 5. As shown therein, the guide 41 has a recessed area 42 formed in one face thereof which defines both an upper guide surface 42a and a lower guide surface 42b. The guides surfaces 42a and 42b curve inwardly toward one another from a receiving end of the guide 41 to a discharge end. At the receiving end of the guide 41, the guide surfaces 42a and 42b are spaced relatively far apart from one another. At the discharge end of the guide 41, however, the guide surfaces 42a and 42b are spaced relatively close together.

In use, the guide 41 is positioned such that as the article supporting mechanisms 20 are moved through the system 10, the rollers 36 enter into the receiving end of the guide 41, pass though the recessed area 42 as shown in FIG. 4, and exit from the discharge end of the guide 41. As the rollers 36 enter into the receiving end of the guide 41, they pass between the inwardly curving guide surfaces 42a and 42b. Because the guide surfaces 42a and 42b are spaced apart at the receiving end of the guide 41, the rollers 36 are received therein, regardless of their positions relative to the guide surfaces 42a and 42b. At the discharge end of the guide 41, however, the guide surfaces 42a and 42b are spaced apart from one another by a distance which is only slightly larger than the outer diameter of the rollers 36.

As schematically shown in FIG. 3, the guides 41 are supported on or attached to a height adjusting mechanism 43. The height adjusting mechanism 43 is conventional in the art and may be embodied as any mechanism for raising or lowering the attached guide 41 to a desired position and for releasably maintaining the guide 41 at such desired position. Preferably, the height adjusting mechanism 43 is attached to a fixed base of the article handling system 10, but any fixed base or support may be used. By adjusting the heights of the guides 41, the guide surfaces 42a and 42b can move the rollers 36 (and, therefore, the platforms 35) to predetermined positions relative to the cylinders 21, the predetermined positions being defined by the guide surfaces 42a and 42b at the discharge end of the guide 41.

For example, when it is desired to raise the heights of the platforms 35 relative to the cylinders 21, one or both of the height adjusting mechanisms 43 is initially moved upwardly and secured in a desired position. Subsequently, as one of the article supporting mechanisms 20 moves by, its associated roller 36 will enter into the receiving end of the guide 41 and engage the lower guide surface 42b. Because of such engagement, the roller 36 (and the lower rod 31 secured thereto) are pushed upwardly toward the cylinder 21. Consequently, an upwardly directed force is exerted against the piston 26, causing it to compress the air in the upper chamber 27. When the air pressure in the upper chamber 27 exceeds the air pressure in the lower chamber 28 by the predetermined value required to open the first pressure relief valve 32, the piston 26 will move upwardly within the cylinder 21. Accordingly, the support platform 35 is also moved upwardly.

Such upward movement continues until the roller 36 exits the discharge end of the guide 41. At that time, the first pressure relief valve 32 closes, and the piston 26 (and the support platform 35 secured thereto) automatically becomes locked in its new position. The same series of actions occurs as subsequent article supporting mechanisms 20 pass through the guide 41. Thus, by raising the height adjusting mechanism 43, the relative heights of the all of the platforms 35 may be changed as the rollers 36 pass through the guide 41. Furthermore, once the heights are changed in this manner, the platforms 35 are automatically locked in their new positions. It will be apparent that a similar series of actions occurs when the height adjusting mechanisms 43 are changed downwardly, causing the rollers 36 to engage the upper guide surface 42a and move the platforms 35 downwardly.

Figure 6:
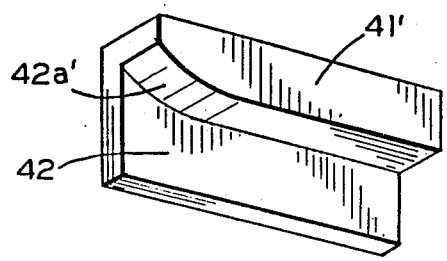
FIG. 6 is a perspective view of an alternate embodiment of the guide illustrated in FIG. 5.

An alternative embodiment for the guide 41 is illustrated in FIG. 6. As shown therein, an alternative guide 41' includes a recessed area 42' formed in one face thereof which defines a single guide surface 42a'. The alternative guide 41' functions identically to the guide 41 described above, except that it is capable of engaging the roller 36 for movement in one direction only, downwardly in the illustrated embodiment. A similar alternative guide (not shown) may be provided for engaging the roller 36 for movement in the upward direction.

As described above, the interior of the cylinder 21 is filled with air at atmospheric pressure. By filling the cylinder 21 with air or other relatively easily compressible gaseous material, the article will be somewhat resiliently supported on the platform 35. This occurs because the gas in the lower chamber 28, for example, can be compressed to a slightly smaller volume when an article is placed upon the platform 35. Consequently, the piston 26 may move slightly within the cylinder 21, even though both of the pressure relief valves 32 and 33 remain closed. By increasing the pressure of the gas within the upper and lower chambers 27 and 28 (by introducing additional gas through the valve 23b), the amount of resiliency will be reduced. Alternatively, the interior of the cylinder 21 may be filled with liquids, such as water or oil. Such liquids are relatively noncompressible in comparison to gases, resulting in much less resiliency. By selecting the type of fluid to fill the cylinder 21 and the pressure which such fluid is subjected to within the cylinder 21, therefore, a desired measure of resiliency may be achieved.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A mechanism for adjustably supporting an article at a fixed position relative thereto comprising:
   a cylinder defining an interior;
   a movable piston disposed in said cylinder interior, said piston dividing said cylinder interior into upper and lower chambers;
   valve means disposed in said piston for selectively permitting fluid communication between said upper and lower chambers, said valve means being normally closed to maintain said piston at a fixed position within said cylinder and opening only when the pressure differential exerted thereacross exceeds a predetermined value to permit movement of said piston within said cylinder; and
   means connected to said piston and extending out of said cylinder for engaging and supporting an article at the fixed position.

2. The invention defined in claim 1 wherein said valve means includes a pressure relief valve disposed in an aperture formed through said piston for selectively permitting fluid communication from said upper chamber to said lower chamber when the pressure in said upper chamber exceeds the pressure in said lower chamber by said predetermined value.

3. The invention defined in claim 1 wherein said valve means includes a pressure relief valve disposed in an aperture formed through said piston for selectively permitting fluid communication from said lower chamber to said upper chamber when the pressure in said lower chamber exceeds the pressure in said upper chamber by said predetermined value.

4. The invention defined in claim 1 wherein said valve means includes a first pressure relief valve disposed in a first aperture formed through said piston for selectively permitting fluid communication from said upper chamber to said lower chamber when the pressure in said upper chamber exceeds the pressure in said lower chamber by said predetermined value, said valve means further including a second pressure relief valve disposed in a second aperture formed through said piston for selectively permitting fluid communication from said lower chamber to said upper chamber when the pressure in said lower chamber exceeds the pressure in said upper chamber by said predetermined value.

5. The invention defined in claim 1 wherein said cylinder interior is filled with a fluid.

6. The invention defined in claim 5 wherein said fluid is a gas.

7. The invention defined in claim 5 wherein said fluid is a liquid.

8. The invention defined in claim 1 wherein means for engaging and supporting an article includes a rod connected to said piston and extending out of said cylinder and an article engaging platform connected to said rod.

9. The invention defined in claim 1 further including means for adjusting the position of said piston and said article engaging and supporting means relative to said cylinder.

10. The invention defined in claim 9 wherein said means for adjusting includes a rod connected to said piston and extending out of said cylinder and guide means cooperable with said rod for urging said piston in a desired direction.

11. The invention defined in claim 10 wherein said rod has a roller supported thereon for cooperation with said guide means.

12. The invention defined in claim 10 wherein said guide means includes a recessed area defining a guide surface, said rod cooperating with said guide surface to urge said piston in a desired direction.

13. The invention defined in claim 12 where said guide means includes a recessed area defining a pair of guide surfaces, said rod cooperating with said guide surfaces to urge said piston in a desired direction.

14. The invention defined in claim 1 wherein said article supporting mechanism is carried on an article transportation system for supporting and transporting articles.

15. An article handling and transportation system comprising:
   a mechanism for adjustably supporting an article at a fixed position relative thereto including a cylinder defining an interior, a movable piston disposed in said cylinder interior and dividing said cylinder interior into upper and lower chambers, valve means disposed in said piston for selectively permitting fluid communication between said upper and lower chambers, said valve means being normally closed to maintain said piston at a fixed position within said cylinder and opening only when the pressure differential exerted thereacross exceeds a predetermined value to permit movement of said piston within said cylinder, and means connected to said piston and extending out of said cylinder for engaging and supporting an article at the fixed position; and means for moving said article supporting mechanism so as to transport an article supported thereon from one location to another.

16. The invention defined in claim 15 wherein a plurality of said article supporting mechanisms are provided, and said means for moving moves all of said article supporting mechanisms for simultaneously transporting a plurality of articles from one location to another.

17. The invention defined in claim 15 wherein said valve means includes a first pressure relief valve disposed in a first aperture formed through said piston for selectively permitting fluid communication from said upper chamber to said lower chamber when the pressure in said upper chamber exceeds the pressure in said lower chamber by said predetermined value, said valve means further including a second pressure relief valve disposed in a second aperture formed through said piston for selectively permitting fluid communication from said lower chamber to said upper chamber when the pressure in said lower chamber exceeds the pressure in said upper chamber by said predetermined value.

* * * * *